(12) United States Patent
Chang

(10) Patent No.: US 10,182,114 B2
(45) Date of Patent: Jan. 15, 2019

(54) MEDIA CONTENT SHARING METHOD AND SERVER

(71) Applicant: NOVATEK Microelectronics Corp., Hsin-Chu (TW)

(72) Inventor: Wei-Chung Chang, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 241 days.

(21) Appl. No.: 15/201,603

(22) Filed: Jul. 4, 2016

(65) Prior Publication Data

US 2018/0007135 A1 Jan. 4, 2018

(51) Int. Cl.
*G06F 15/16* (2006.01)
*H04L 29/08* (2006.01)
*H04L 29/06* (2006.01)

(52) U.S. Cl.
CPC ...... *H04L 67/1097* (2013.01); *H04L 65/4084* (2013.01); *H04L 65/60* (2013.01); *H04L 65/608* (2013.01); *H04L 67/02* (2013.01); *H04L 67/42* (2013.01)

(58) Field of Classification Search
CPC ..... H04L 65/60; H04L 67/1097; H04L 67/02; H04L 67/42
See application file for complete search history.

(56) References Cited

U.S. PATENT DOCUMENTS

| | | | |
|---|---|---|---|
| 2002/0001395 A1* | 1/2002 | Davis | G06F 21/10 382/100 |
| 2006/0080286 A1* | 4/2006 | Svendsen | G06F 17/30265 |
| 2008/0155627 A1* | 6/2008 | O'Connor | H04N 7/173 725/109 |
| 2009/0150350 A1* | 6/2009 | Yu | G06F 15/16 |
| 2009/0150520 A1* | 6/2009 | Garcia | H04L 12/2812 709/219 |
| 2009/0150570 A1* | 6/2009 | Tao | H04L 67/06 709/249 |
| 2010/0023578 A1* | 1/2010 | Brant | G06F 17/30749 709/203 |
| 2010/0083303 A1* | 4/2010 | Redei | H04N 7/17318 725/32 |
| 2011/0016353 A1* | 1/2011 | Mikesell | G06F 11/1435 714/15 |
| 2011/0173305 A1* | 7/2011 | Matuszewski | H04L 45/02 709/221 |

(Continued)

FOREIGN PATENT DOCUMENTS

| | | |
|---|---|---|
| CN | 103986787 A | 8/2014 |
| TW | 201308192 A1 | 2/2013 |
| TW | 201530500 A | 8/2015 |

*Primary Examiner* — Jonathan A Bui
(74) *Attorney, Agent, or Firm* — Winston Hsu

(57) ABSTRACT

A media content sharing method is provided which includes receiving a query message including query information associated with a media content from a client device, determining whether a storage unit contains a target description file including at least a segment information including characteristics corresponding to the query information, whereby the storage unit stores a plurality of description files uploaded from a plurality of content providing devices, and transmitting a request message to a first content providing device which uploads the target description file, for requesting the first content providing device to provide a target media segment.

13 Claims, 4 Drawing Sheets

(56) References Cited

U.S. PATENT DOCUMENTS

| | | | |
|---|---|---|---|
| 2014/0164573 A1* | 6/2014 | Hsiao | G06F 17/30129 709/219 |
| 2014/0337454 A1* | 11/2014 | Yamamoto | H04L 67/34 709/208 |
| 2015/0016804 A1 | 1/2015 | Biderman | |
| 2016/0034539 A1* | 2/2016 | Yoon | G06F 17/30528 707/769 |
| 2016/0098998 A1* | 4/2016 | Wang | G06F 17/30976 704/246 |
| 2017/0004139 A1* | 1/2017 | Wong | G06F 17/3082 |
| 2017/0192884 A1* | 7/2017 | Ataras | G06F 12/084 |

* cited by examiner

MEDIA CONTENT SHARING METHOD AND SERVER

BACKGROUND OF THE INVENTION

1. Field of the Invention

The present invention relates to a media content sharing method and server, and more particularly, to a media content sharing method and server capable of facilitating media content sharing among content providing devices and client devices.

2. Description of the Prior Art

With the progression of science and technology, the functions of the digital camera have been widely applied in many applications. Video contents captured by the digital camera may be stored on a digital video recorder, but the video contents are usually difficult to be shared with others.

For example, cars are often equipped with car video recorders for recording video contents. When a car is involved in a traffic accident, a driver of the car may want to find the recorded video contents recorded by other cars surrounding the accident location when the traffic accident occurs, for clarifying responsibility in the accident. However, it is difficult to know which car records video contents when the traffic accident occurs at the location, and the driver has little opportunity to get video contents associated with the traffic incident from other cars. In other words, the recorded video contents cannot be shared among cars using car video recorders. Thus, there is a need of improving the video content sharing.

SUMMARY OF THE INVENTION

It is therefore an objective of the present invention to provide a media content sharing method and server capable of facilitating media content sharing among content providing devices and client devices.

The present invention discloses a media content sharing method, comprising: receiving a query message including query information associated with a media content from a client device; determining whether a storage unit contains a target description file including at least a segment information including characteristics corresponding to the query information, whereby the storage unit stores a plurality of description files uploaded from a plurality of content providing devices; and transmitting a request message to a first content providing device which uploads the target description file, for requesting the first content providing device to provide a target media segment.

The present invention further discloses a server, comprising: a first storage unit, for storing description files uploaded from a plurality of content providing devices; and a processing unit, for receiving a query message including query information associated with a media content from a client device, determining whether the first storage unit contains a target description file including at least a segment information including characteristics corresponding to the query information and transmitting a request message to a first content providing device which uploads the target description file for requesting the first content providing device to provide a target media segment.

The present invention further discloses a method of retrieving media contents for a device, comprising: sending a query message including query information associated with a media content to a server; and receiving a target media segment which is originated from a first content providing device based on the server determining that a target description file including at least a segment information including characteristics corresponding to characteristics of the query information exists in the server.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
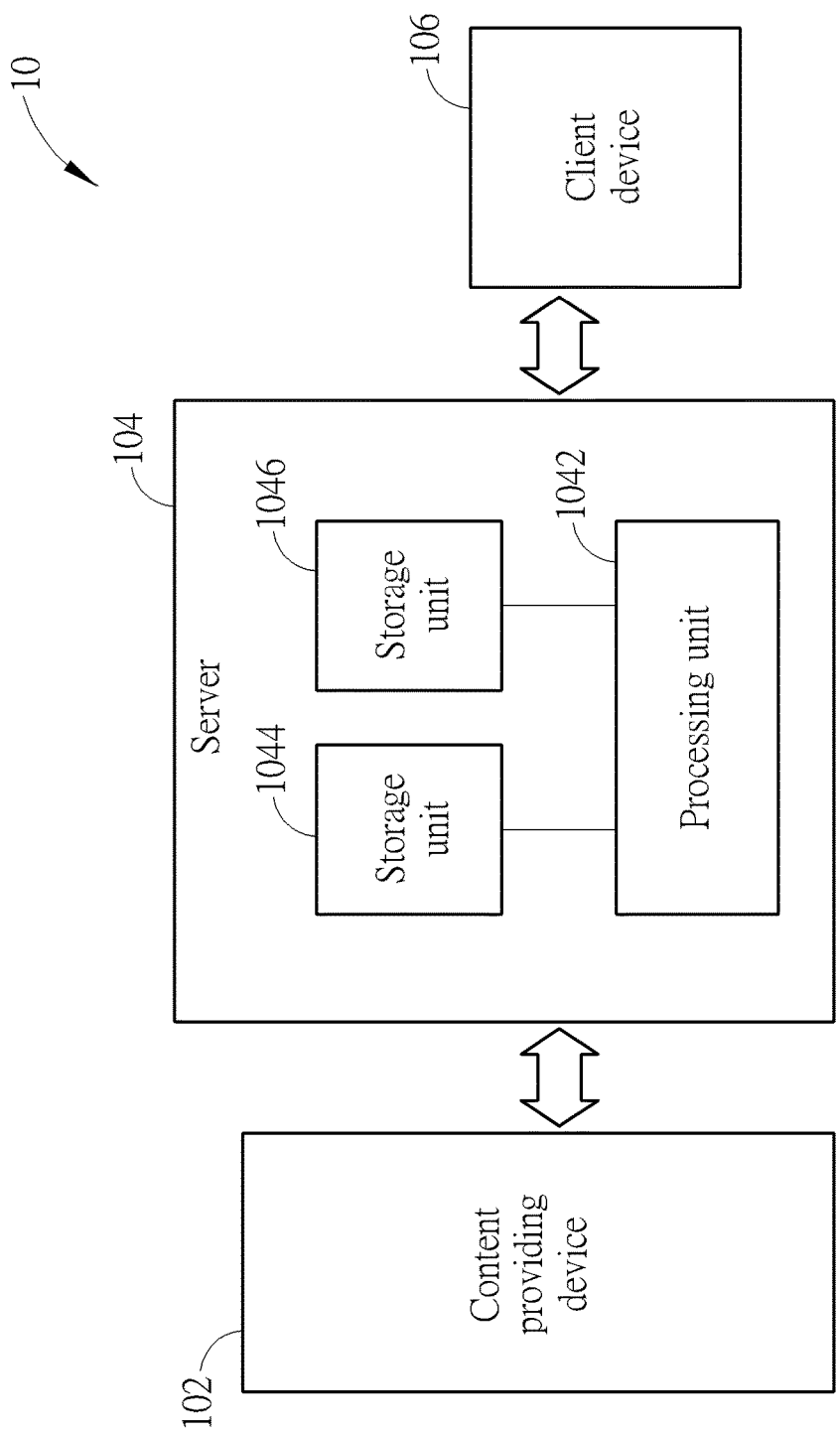
FIG. 1 is a schematic diagram of a multimedia system according to an exemplary embodiment of the present invention.

Please refer to FIG. 1, which is a schematic diagram of a multimedia system 10 according to an exemplary embodiment of the present invention. The multimedia system 10 includes a content providing device 102, a server 104 and a client device 106. The content providing device 102, the server 104 and the client device 106 may communicate with each other via a wireless or wired connection. The multimedia system 10 may include a plurality of content providing devices and the content providing device 102 is one of them for the illustrative purpose.

The content providing device 102 is utilized for capturing and recording multimedia contents. The recorded multimedia contents may include video contents, audio contents and/or other data. The content providing device 102 may include a media capturing device, such as a camera (e.g., an Internet protocol camera, a video camera, a surveillance camera) and a digital video recorder for capturing and recording multimedia contents. The content providing device 102 may generate a media segment periodically, e.g., for every 5 seconds, and thus a multimedia file in minutes or hours is formed by a plurality of media segments; meanwhile, the content providing device 102 may generate a segment information for each media segment, and generate a description file including a plurality of segment information. A segment information is corresponding to a media segment and may include at least one characteristic of time information (e.g., period of the media segment, start timing, etc.), location information (e.g., location name, geographical coordinates of location), an image corresponding to the time information which may be captured during generating the media segment, and any other information about the media segment. The segment information is regarded as metadata associated with the media segment.

In a general case, the content providing device 102 may store and update its description file in the server 104 which the content providing device 102 registers with an account. The content providing device 102 may periodically update the description file to the server 104 according to predetermined configuration, such as every two hours. In another example, the content providing device 102 may update the description file in response to a request from the server 104. Different live streaming protocol standards have their own description file format which is not compatible with each other but has similarity. For example, Dynamic Adaptive Streaming over HTTP (DASH), known as MPEG DASH, defines a Media Presentation Description (MPD) file as a description file, and a MPD file is analogous to an m3u8 file in HTTP Live Streaming (HLS), a Manifest file in Smooth Streaming, or an f4m file in HTTP Dynamic Streaming.

The server 104 includes a processing unit 1042, storage units 1044 and 1046. The storage unit 1044 is utilized for storing description files uploaded from different content providing devices in the multimedia system 10. The storage unit 1046 is utilized for storing media segments from different content providing devices in the multimedia system 10. The processing unit 1042 is utilized for searching the storage unit 1044 for a description file (as a target), and requesting, if the target description file is founded in the storage unit 1044, a content providing device which uploads the target description file (such as the content providing device 102) to transmit target media segments to the server 104. The storage unit 1046 is utilized for storing media segments uploaded from content providing devices, such as the content providing device 102. Note that the processing unit 1042 searching the storage unit 1044 and requesting the content providing device 102 for media segments may be triggered by a request from the client device 106.

In addition, the description files stored in the storage unit 1044 may be updated. For example, the server 104 may receive an updated description file from the content providing device 102 and replace a description file previously uploaded from the content providing device 102 with the updated description file. Note that the server 104 may receive the updated description file directly from the content providing device 102, or indirectly from the content providing device 102, e.g., via a cloud server.

Figure 2:
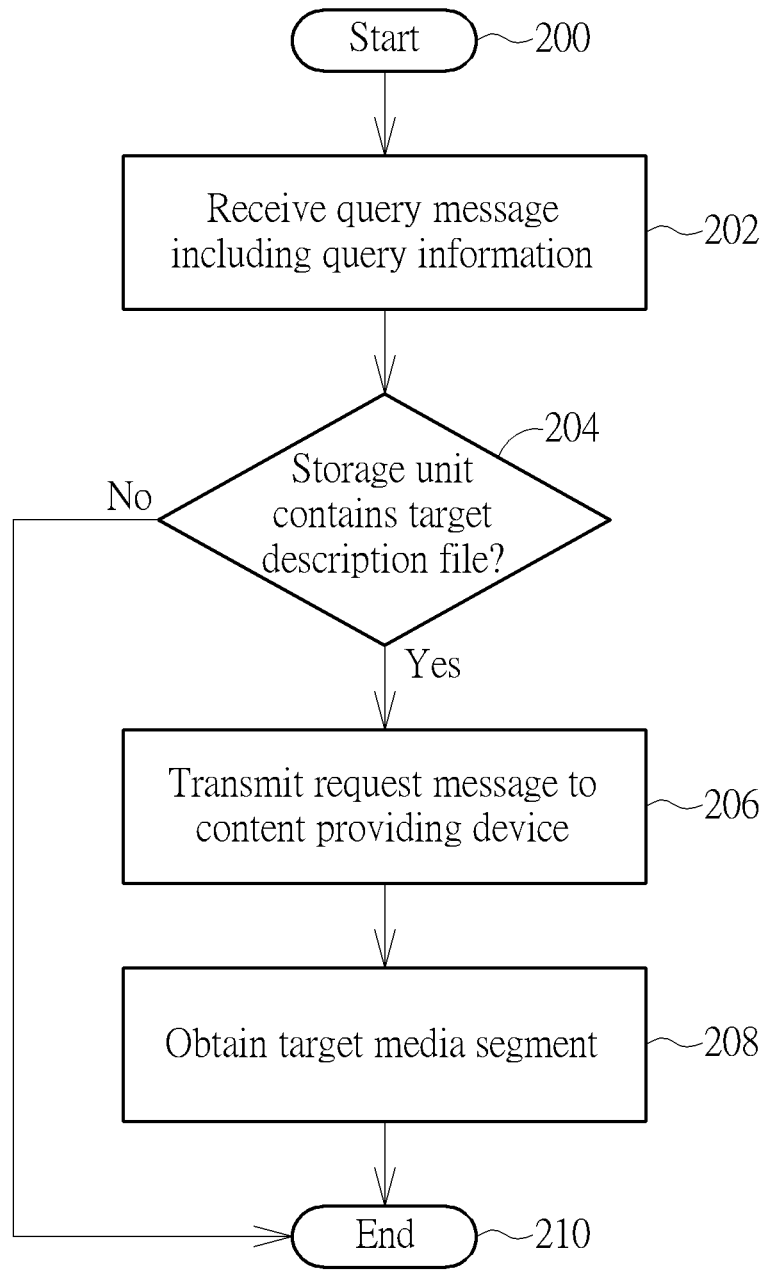
FIG. 2 is a flow diagram of a procedure according to an exemplary embodiment of the present invention.

For an illustration of the operations of the multimedia system 10, please refer to FIG. 2. FIG. 2 is a flow diagram of a procedure 20 according to an exemplary embodiment of the present invention. The flow diagram in FIG. 2 mainly corresponds to the operations on the multimedia system 10 shown in FIG. 1. Please note that those skilled in the art will should observe that the method shown in FIG. 2 can include other intermediate steps or several steps can be merged into a single step. In an embodiment, assume the client device 106 wants to obtain a media content, and the client device 106 sends a query message including query information associated with the media content, to the server 104. The query information may include at least one characteristic of time information (e.g., a range of time), location information (e.g., location name, geographical coordinates of location), an image corresponding to the location information and any other information about the media content. According to Step 202, the server 104 receives the query message including query information associated with the media content from the client device 106.

In Step 204, after receiving the query message, the processing unit 1042 of the server 104 checks whether the storage unit 1044 contains a target description file including at least a segment information including characteristics corresponding to the query information of the query message. In other words, the processing unit 1042 searches the storage unit 1044 for one or more description files including at least a segment information which includes characteristics matching the characteristics corresponding to the query information. In more detail, the processing unit 1042 determines whether characteristics of at least a segment information of a description file stored in the storage unit 1044 matches the characteristics of the query information. When determining that at least one of the characteristics of at least a segment information of a first description file of the description files stored in the storage unit 1044 matches the characteristics of the query information, the processing unit 1042 may determine the first description file to be as a target description file. It is noted that the media content which the client device 106 requires through the query message may be satisfied with part, or all, of media segments corresponding to a plurality of segment information that the target description file includes. In other words, one or more media segments are regarded as target media segments if these media segments are corresponding to segment information which includes characteristics matching the characteristics of the query information.

Characteristic matching may have various embodiments. In an embodiment, the processing unit 1042 may determine a description file stored in the storage unit 1044 to be as the target description file when determining that the description file includes at least a segment information including characteristics that entirely match all of the characteristics of the query information. In another embodiment, the processing unit 1042 may determine a description file of the description files stored in the storage unit 1044 to be as the target description file when determining that the description file includes at least a segment information including the characteristics matching part of the characteristics of the query information, instead of entirely matching. In this embodiment, one or more media segments those have segment information including characteristics matching part of the characteristics of the query information are regarded as target media segments.

In still another embodiment, the processing unit 1042 may determine whether one or more description files stored in the storage unit 1044 includes at least a segment information including the characteristics that entirely match all of the characteristics of the query information. If not, the processing unit 1042 further determines whether one or more description files stored in the storage unit 1044 includes at least a segment information including the at least one characteristic that matches part of the characteristics of the query information. Further, when determining one or more description files stored in the storage unit 1044 include at least a segment information including at least one characteristic that matches part of the characteristics of the query information, the processing unit 1042 may determine the one or more description files stored in the storage unit 1044 to be as the target description files. In still another embodiment, when determining that a plenty of description files stored in the storage unit 1044 include at least a segment information including at least one characteristic that matches part of the characteristics of the query information, the processing unit 1042 may choose one or more description files including segment information including a maximum number of characteristics matching the characteristics of the query information to be as one or more target description files.

It should be noticed that in the above embodiments of characteristics matching schemes, characteristics such as time information and location information in a segment information of a description file may be accurate values (e.g., 10:37:25 AM), whereas time information and location information in the query information of the query message may indicate rough values or ranges (e.g., about 10:30 AM, 2:20-2:40 PM, "intersection of 3th Boulevard and 5th Street", or "in front of City Hall") since they may be determined by the user of the client device 106. Therefore, in the present disclosure, "a segment information includes characteristics matching the characteristics of the query information" means the segment information includes characteristics which may exactly match the characteristics of the query information or, more commonly, includes characteristics which may be within a range configured based on the characteristics of the query information.

After one or more target description files are founded in the storage unit 1044, in Step 206, the processing unit 1042 transmits a request message to a content providing device which uploads the determined target description file, such as the content providing device 102 of FIG. 1, for requesting the content providing device 102 to provide one or more target media segments.

In Step 208, the server 104 may obtain at least a target media segment from the content providing device 102. In an embodiment, before providing the target media segment, the content providing device 102 may perform a process to determine whether to provide the target media segment to the server 104 because the target media segment captured by the content providing device 102 may include video that the owner of the content providing device 102 regards as private information, and the server 104 receives the target media segment only after the content providing device 102 agrees to provide the target media segment in response to the request message. In another embodiment, the request message sent to the content providing device 102 can also be a mandatory request that the content providing device 102 has to agree with, if the target media segment is related to public safety or other emergency issue. After the server 104 receives the target media segment from the content providing device 102, the server 104 stores the received target media segment into the storage unit 1046.

In an embodiment, when obtaining the target media segment, the server 104 may inform the client device 106 that the target media segment has been obtained by an informing message, and the client device 106 can access the target media segment when the client device 106 needs it. In another embodiment, when obtaining the target media segment, the server 104 may transmit and store the target media segment to a cloud storage device and inform the client device 106 of how to access the target media segment. Accordingly, the client device 106 can access the target media segment stored in the cloud storage device when the client device 106 needs it.

In addition, the server 104 may include identity information of the client device 106 which wants to access the target media segment in the request message sent to the content providing device 102 which uploads the target description file. In addition, the server 104 may also send identity information of the content providing device 102 providing the target media segment accompanying with a message informing the client device 106 that the target media segment has been obtained.

In another embodiment, after receiving the request message from the server 104 and agreeing to provide the target media segment, the content providing device 102 may upload the target media segment to a cloud storage device instead of the server 104, and the client device 106 can access the target media segment stored in the cloud storage device when the client device 106 needs it. In still another embodiment, the content providing device 102 may directly transmit the target media segment to the client device 106. That is, the client device 106 may obtain target media segment after the server 104 determines existence of the target description file and the content providing device 102 agrees to provide the target media segments in response to the request message. The transmission path through which the client device 106 obtains the target media segment from, e.g., from the server 104 or a cloud storage device, or directly from the content providing device 102, is not limited herein.

Figure 3:
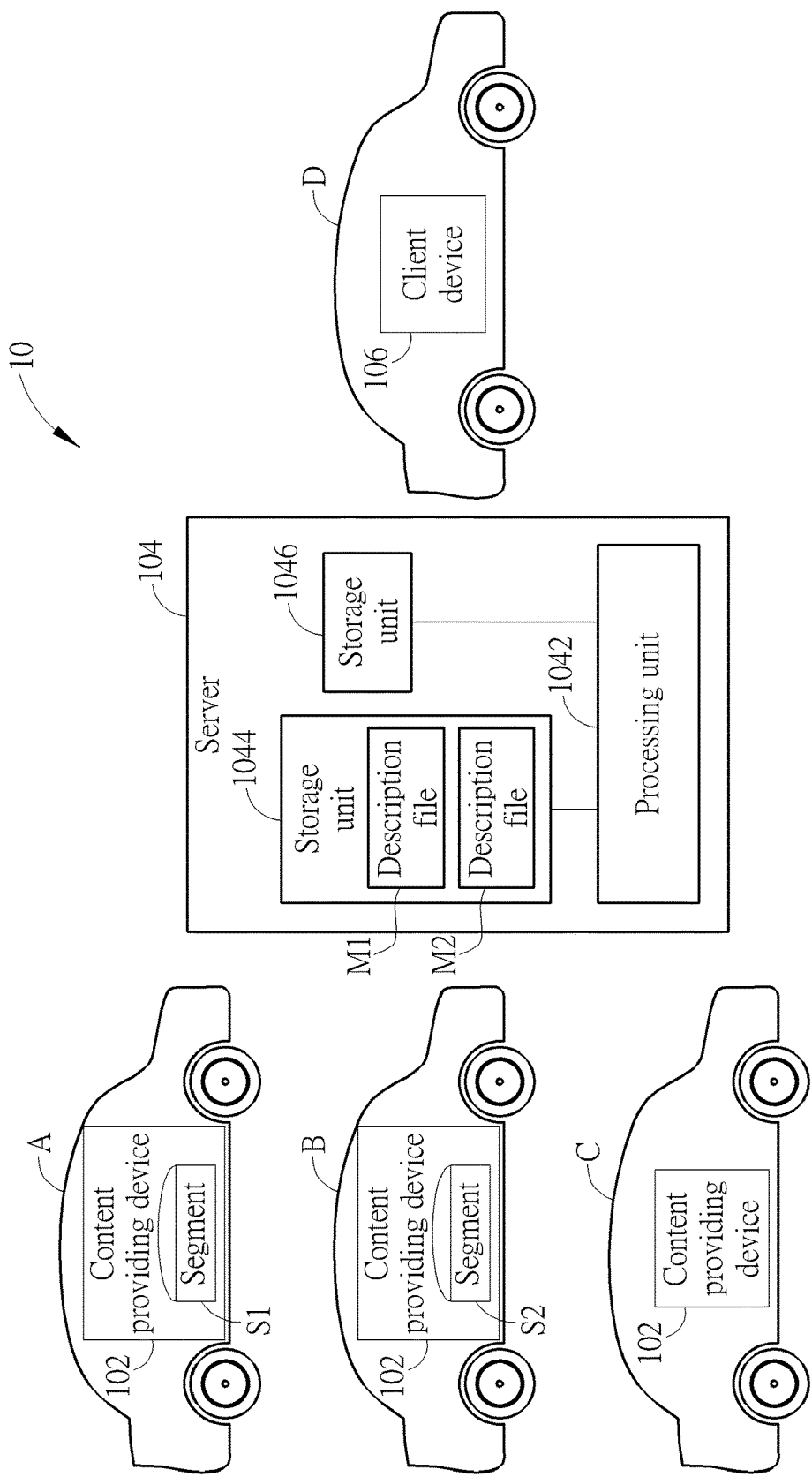
FIG. 3 is a schematic diagram illustrating an exemplary implementation of the multimedia system for data sharing according to an exemplary embodiment of the present invention.

FIG. 3 is a schematic diagram illustrating an exemplary implementation of the multimedia system 10 for data sharing according to an exemplary embodiment of the present invention. The multimedia system 10 may be implemented based on the Dynamic Adaptive Streaming over HTTP (DASH) streaming technology. Assume cars A, B and C are equipped, respectively, with a content providing device 102 for capturing and recording multimedia contents and creating associated a description file corresponding to media segments. A car D is equipped with a client device 106. When a user of the car D wants to get a required media content, such as other's video recording files around the location of a car accident, user of the car D can use the client device 106 to send a query message including query information associated with the required media content to the server 104. After receiving the query message, the processing unit 1042 of the server 104 determines whether the storage unit 1044 contains one or more target description files including at least a segment information including characteristics which match the characteristics of the query information, which is assumed to include time information TS, location information LS and an image IMS corresponding to the location information LS (that is, the image IMS is captured around a location corresponding to the location information LS.)

After searching the storage unit 1044, the processing unit 1042 determines that a description file M1, which is uploaded by the car A and includes 10 segment information respectively including time information TA1-TA10, location information LA1-LA10 and images IMA1-IMA10 corresponding to the time information TA1-TA10, matches all of the characteristics (time information TS, location information LS and an image IMS) of the query information. That is, the time information TA1-TA10 are within a time range configured based on the time information TS in the query information, the location information LA1-LA10 are within a range configured based on the location information LS of the query information, and the images IMA1-IMA10 are determined to be similar as the image IMS of the query information. The processing unit 1042 also determines that a description file M2, which is uploaded by the car Band includes 4 segment information respectively including time information TB1-TB4 and location information LB1-LB4 and not including any image, matches a part of the characteristics (time information TS, location information LS and an image IMS) of the query information. That is, the time information TB1-TB4 are within the time range configured based on the time information TS in the query information, and the location information LB1-LB4 are within a range configured based on the location information LS of the query information.

In this example, both of the description files M1 and M2 may be chosen as target description files. The processing unit 1042 respectively transmits request messages to the content providing devices 102 of the car A which upload the description file M1 and the content providing devices 102 of the car B which upload the description file M2. Accordingly, the content providing device 102 of the car A may transmit at least a target media segment S1 (corresponding to at least a segment information of the ten matched segment information of the description file M1) to the server 104, and the content providing device 102 of the car B may transmit at least a target media segment S2 (corresponding to at least a segment information of the four matched segment information of the description file M2) to the server 104. As such, the server 104 may provide the media segments S1 and S2 which meet the requirement in the query message as much as possible, to the client device 106 of the car D.

Figure 4:
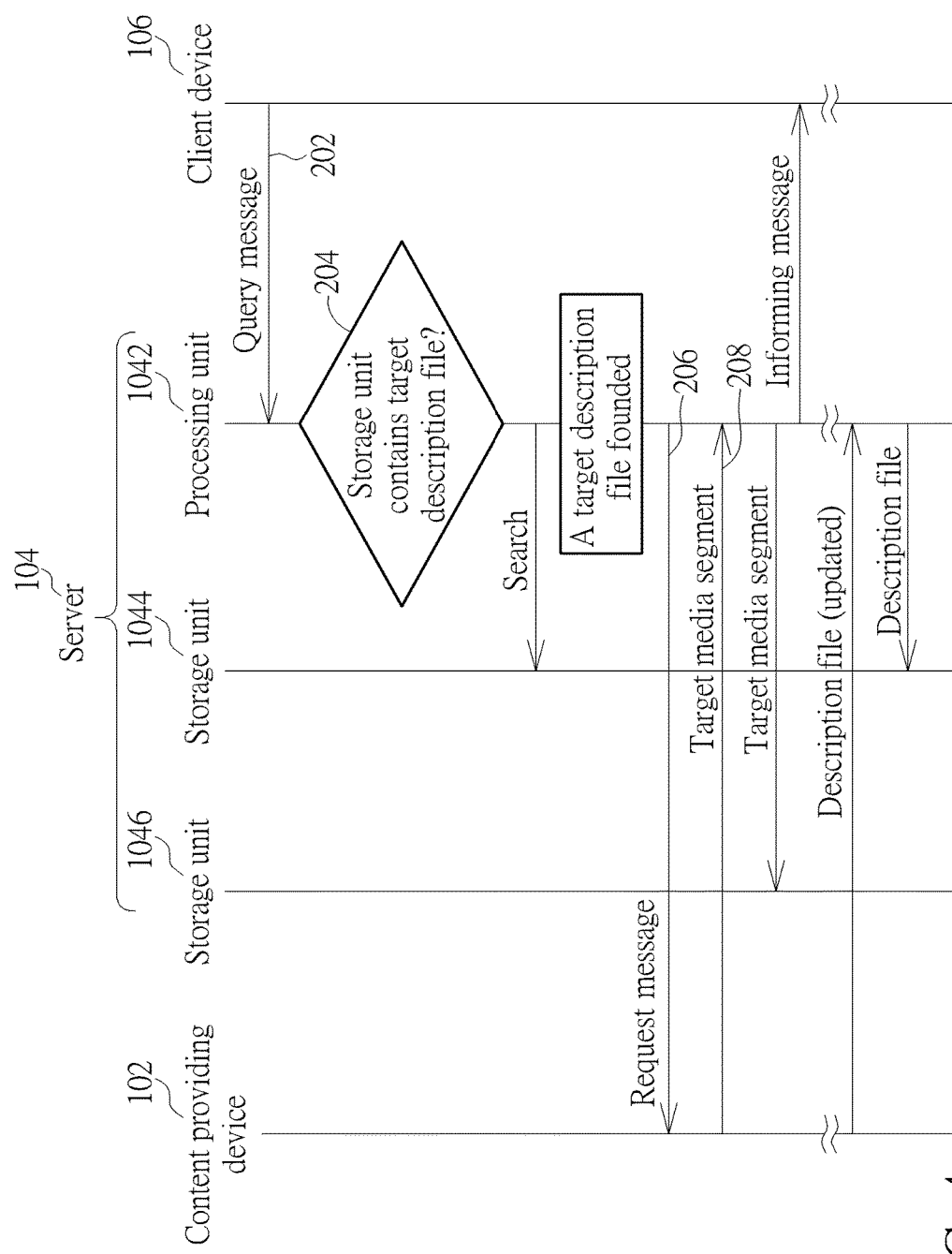
FIG. 4 is a flow diagram of a procedure according to an exemplary embodiment of the present invention.

FIG. 4 is a flow diagram of a procedure illustrating interactions among the server 104, the client device 106 and the content providing device 102, based on the procedure 20. Other exemplary embodiment such as description file update is also shown in FIG. 4. It should be noted that a device, such as car video recorder, may play the roles of both a content providing device and a client device. When more devices involve in the multimedia system 10, each device can provide media content that other device needs and have more opportunities to obtain interested media content shared by other devices.

In summary, via the description file searching, the invention can find a target media segment needed for the client device so as to facilitate media content sharing among content providing devices and client devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A media content sharing method, comprising:
   receiving a query message including query information associated with a media content from a client device;
   determining whether a storage unit contains a target description file including at least a segment information including characteristics corresponding to the query information, whereby the storage unit stores a plurality of description files uploaded from a plurality of content providing devices;
   in response to determining that the target description file including at least a segment information including characteristics corresponding to the query information exists, transmitting a request message to a first content providing device which uploads the target description file, for requesting the first content providing device to provide a target media segment; and
   obtaining the target media segment from the first content providing device and transmitting the target media segment to the client device.

2. The media content sharing method of claim 1, wherein the step of obtaining the target media segment from the first content providing device comprises receiving the target media segment after the first content providing device agrees to provide the target media segment in response to the request message.

3. The media content sharing method of claim 1, wherein the step of determining whether the storage unit contains the target description file including at least a segment information including characteristics corresponding to the query information comprises:
   determining whether characteristics of at least a segment information of one of the description files stored in the storage unit match the characteristics of the query information.

4. The media content sharing method of claim 1, further comprising:
   receiving an updated description file from the first content providing device; and
   replacing a description file previously uploaded from the first content providing device with the updated description file.

5. The media content sharing method of claim 1, wherein each of the description files stored in the storage unit includes a plurality of segment information, each segment information including at least one characteristic of time information, location information and an image corresponding to the time information.

6. The media content sharing method of claim 1, wherein the query information includes at least one characteristic of time information, location information and an image corresponding to the location information.

7. A server, comprising:
   a first storage unit, for storing description files uploaded from a plurality of content providing devices; and
   a processing unit, for receiving a query message including query information associated with a media content from a client device, determining whether the first storage unit contains a target description file including at least a segment information including characteristics corresponding to the query information and in response to determining that the target description file including at least a segment information including characteristics corresponding to the query information exists, transmitting a request message to a first content providing device which uploads the target description file for requesting the first content providing device to provide a target media segment;
   wherein the processing unit obtains the target media segment from the first content providing device and transmits the target media segment to the client device.

8. The server of claim 7, wherein the processing unit obtains the target media segment after the first content providing device agrees to provide the target media segment in response to the request message.

9. The server of claim 7, wherein the processing unit determines whether characteristics of at least a segment information of one of the description files stored in the first storage unit match the characteristics of the query information.

10. The server of claim 7, wherein the processing unit receives an updated description file from the first content providing device and replaces a description file previously uploaded from the first content providing device with the updated description file.

11. The server of claim 7, further comprising:
    a second storage unit, for storing the target media segment.

12. The server of claim 7, wherein each of the description files stored in the first storage unit includes a plurality of segment information, each segment information including at least one characteristic of time information, location information and an image corresponding to the time information.

13. The server of claim 7, wherein the query information includes at least one characteristic of time information, location information and an image corresponding to the location information.

* * * * *